US006599736B2

(12) United States Patent
McCaskill et al.

(10) Patent No.: US 6,599,736 B2
(45) Date of Patent: Jul. 29, 2003

(54) CONFIGURABLE MICROREACTOR NETWORK

(75) Inventors: John Simpson McCaskill, Bonn (DE); Thomas Maeke, Bonn (DE); Patrick Wagler, Boppard (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 13 days.

(21) Appl. No.: 09/935,740

(22) Filed: Aug. 24, 2001

(65) Prior Publication Data

US 2002/0028504 A1 Mar. 7, 2002

(30) Foreign Application Priority Data

Aug. 25, 2000 (DE) .......................... 100 41 853

(51) Int. Cl.[7] ................................ C12M 1/34
(52) U.S. Cl. ................ 435/288.5; 435/286.5; 435/287.2; 435/289.1; 435/293.1; 435/294.1; 422/81; 422/102; 422/103
(58) Field of Search .................. 435/286.5, 287.2, 435/288.5, 289.1, 293.1, 294.1; 422/81, 102, 103

(56) References Cited

U.S. PATENT DOCUMENTS 5,585,069 A * 12/1996 Zanzucchi et al. .......... 422/100
5,992,820 A * 11/1999 Fare et al. ............. 251/129.01
6,284,113 B1 * 9/2001 Bjornson et al. ........... 204/453
6,319,469 B1 * 11/2001 Mian et al. .................. 422/64
6,403,338 B1 * 6/2002 Knapp et al. ............. 435/91.2
6,431,212 B1 * 8/2002 Hayenga et al. ........... 137/855
6,491,804 B2 * 12/2002 Manz et al. ................ 204/453

FOREIGN PATENT DOCUMENTS

WO  WO 96/15576  *  5/1996
WO  WO 00/60356  *  10/2000

* cited by examiner

Primary Examiner—David A. Redding
(74) Attorney, Agent, or Firm—Birch, Stewart, Kolasch & Birch, LLP

(57) ABSTRACT

The configurable microreactor network of the invention comprises a substrate in which a plurality of overpassing channels are arranged. Said channels are optionally interconnectable via connecting channel arrangements. Between said channels, microreactors are arranged which are connected with the channels. Here, too, channel-connecting arrangements are employed. Said channel-connecting arrangements comprise a plurality of connecting channels in which blocking elements can be positioned or inserted in any other way or activated. The arrangement and/or state of the blocking elements allows the highest possible integration density to be reached respectively for each of a series of specified degrees of (re-) configuration flexibility (the necessity of which depends on the application type).

24 Claims, 3 Drawing Sheets

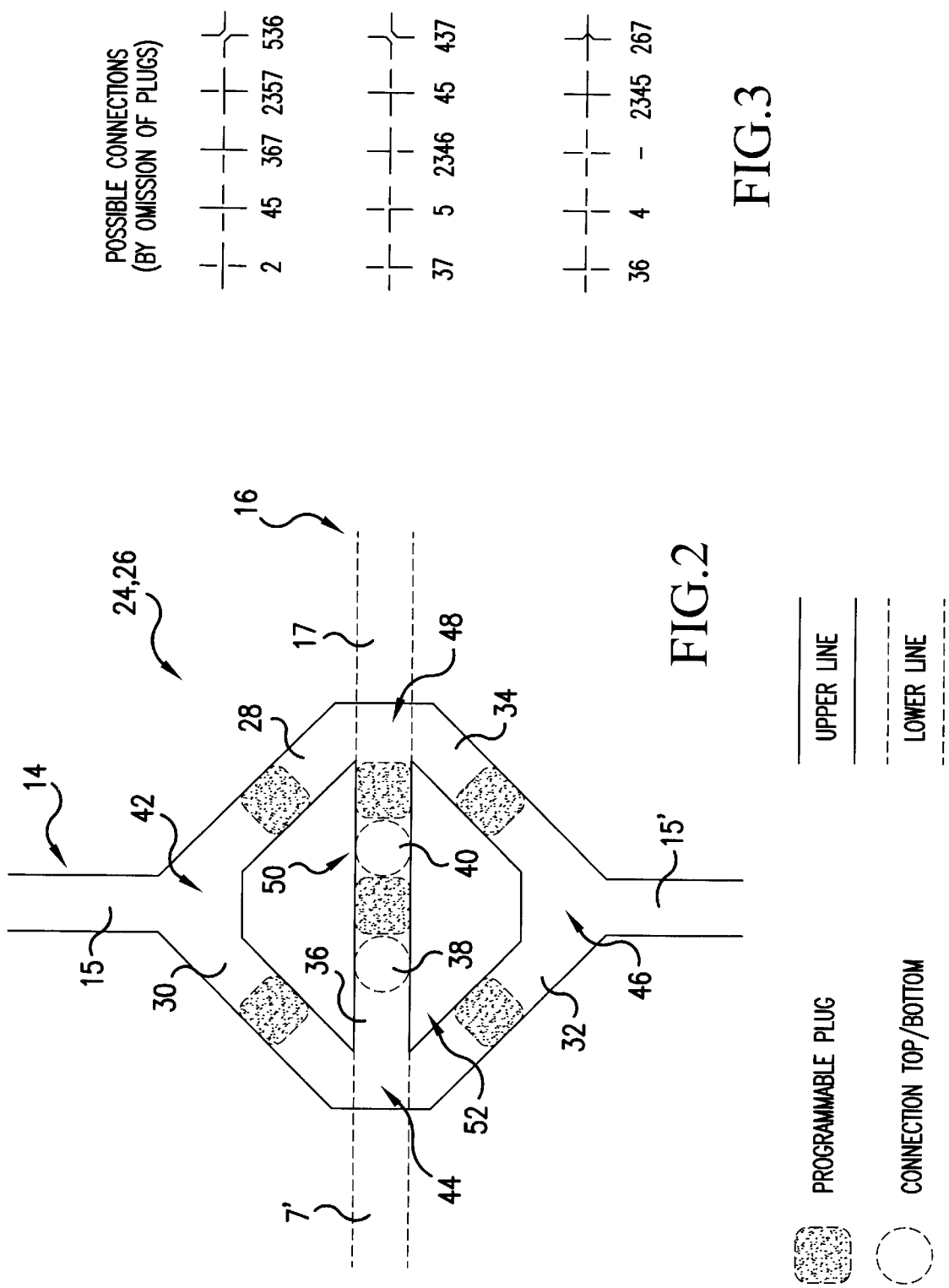

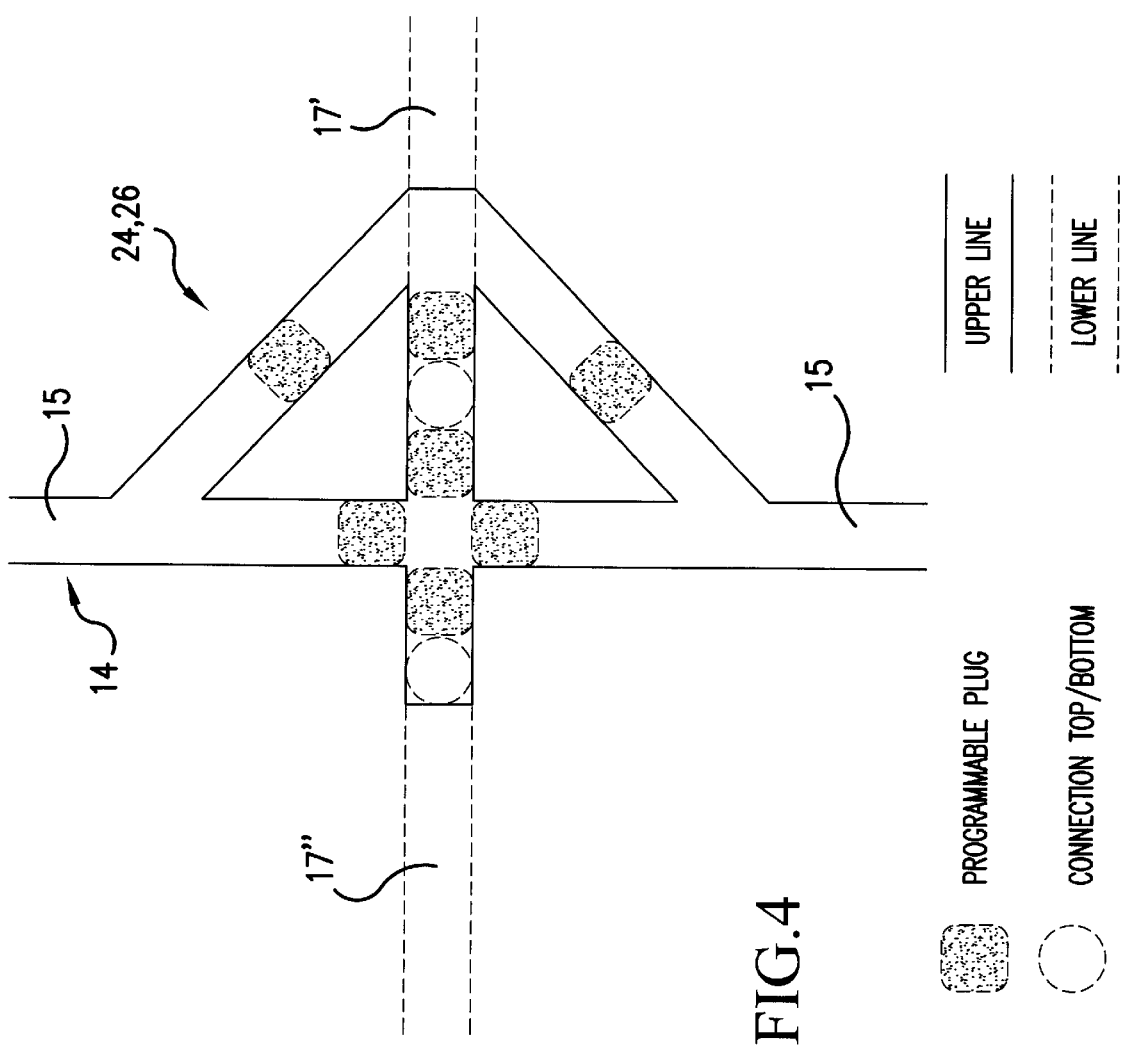

CONFIGURABLE MICROREACTOR NETWORK

BACKGROUND OF THE INVENTION

The present invention relates to configurable and/or reconfigurable microreactor networks, i.e. microfluidic systems comprising microreactors and interconnecting microchannels whose interconnections are designed for single configuration, multiple configuration or dynamic configuration, i.e. they are switchable or reconfigurable.

Such microfluidic systems allow custom-tailored microreactor networks or evolvable microreactor networks to be set up. Any number of said microreactors can be connected in series or in a modular construction above each other such that completely configurable switchable networks of microfluidic systems are produced.

SUMMARY OF THE INVENTION

It is an object of the present invention to provide microfluidic systems, i.e. configurable microreactor networks which have an extremely high integration density, without the requirement of flexibility and variability of the interconnection of microchannels being deleteriously affected.

According to the present invention this object is solved with a configurable microreactor network according to claim 1. The microreactor network of the invention is preferably provided with

- a substrate,
- a plurality of microreactors arranged in the substrate for chemical and/or biological and/or biochemical and/or other type of processing and/or treatment of chemical and/or biological and/or biochemical substances,
- first channels arranged in the substrate and divided into first groups, wherein each first channel group comprises at least one first channel, and wherein the microreactors are arranged between adjacent first channel groups,
- second channels arranged in the substrate and extending above or below the first channels, said second channels being divided into second groups, wherein each second channel group comprises at least one second channel, and wherein the microreactors are arranged between adjacent second channel groups,
- first branch channels starting from the microreactors, said first branch channels being arranged in the substrate and extending at least above or below the second channels of the respective adjacent second channel groups,
- second branch channels starting from the microreactors, said second branch channels being arranged in the substrate and extending at least above or below the first channels of the respective first channel groups adjacent the microreactors, and
- a plurality of connecting channel arrangements disposed at at least some of the point of overpassings of the first and second channels, of the first branch channels and the second channels, and of the second branch channels and the first channels, wherein each connecting channel arrangement comprises:
  - connecting channels between the at least two channel sections of the first and second channels and/or branch channels leading to a point of overpassing, wherein the connecting channels extend from each channel section of a point of overpassing to the respective other channel sections of said point of overpassing, and
  - wherein in the connecting channels blocking elements are arranged for optionally blocking the fluid connection provided by a connecting channel for the purpose of blocking/releasing the fluid connection between the at least two channel sections of a point of overpassing.

The main aspect of the solution according to the present invention is the flexibility of groups of first and second channels and/or first and second branch channels overpassing each other in different planes, wherein the first and second channels extend at an angle, in particular perpendicular to each other between the microreactors preferably arranged in an orthogonal network, and the first and second branch channels starting from the individual microreactors extend to the first and second channels. The channel sections of the at least two channels forming the point of overpassing extend to a point of over(under-)passing and can be selectively and individually connected via a network of connecting channels. When producing these connecting channel networks (referred to above as connecting channel arrangement) it must be ensured that a channel section is selectively connectable with another channel section leading to an overpassing region and, selectively, certain channel section are not interconnected. This is effected by selective insertion of blocking elements or insertion of materials or structures into the connecting channels and/or the channel sections leading to an overpassing region or arranged therein, which allows a connecting channel or channel section to be blocked or released by selectively activating said materials or structures after production of the connecting channel networks. This offers an extremely high degree of both irreversible and reversible configurability. The term "overpassing point" or "crossing point" is meant to denote a region in which channel sections overpass each other or terminate close to each other. These channel sections which possibly do not overpass each other are connected via connection channels which themselves can overpass or cross each other and thus represent an overpass or crossing of the channel sections.

The configurable microreactor networks according to the present invention are produced according to a new method. This new technology allows a so-called "masterchip" to be produced first which is provided, by subsequent progamming, with the interconnection of its microchannels as required for the respective application. "Programming" means both insertion of invariable blocking elements into the connecting channels between adjacent branching points of the connecting channels (this is, so to say, one of the last steps during chip production), and programming of the chip by corresponding treatment (chemical, optical, electrical, precise-mechanical, thermal, biological etc.) to subsequently activate or deactivate materials or structures inserted into the connecting channel arrangements.

The microreactor network according to the present invention is preferably employed in the field of microreactor technology, biology, combinatorial chemistry, clinical diagnostics, active substance screening in the pharmaceutical research or DNA-computing. New methods for producing pharmaceuticals and chemicals can be tested and optimized considerably faster and thus more effectively without laborious development and testing of new microsystems.

One main aspect of the microreactor network according to the present invention are connecting elements (referred to above as blocking elements which can be changed over between a blocking and a release position) which are in particular of bistable and whose state can be switched once (for configuration of the microreactor network) or repeatedly (for configuration or reconfiguration of the microreactor network) to regulate the connecting channel arrangements. The blocking element variant of once-only switchable configuration is an integrable element which has a higher density than blocking elements of the multiply switchable configuration since, in the first case, the infrastructure for the reprogramming of the blocking elements is not required, Besides the possibility to select the microreactors of the array by providing the connecting channel arrangements with blocking elements which cannot be changed over by the user, the following three embodiments and development stages are further conceivable.

1. Irreversible user-programmable array of bistable blocking elements

Specified design measures with previously specified optimized design steps allow standardized microfluidic systems to be prefabricated in large quantities (inexpensively) up to this process stage. The production process starts with CAD mask designing of channel structures and process elements. Thereafter, the photolithographic thin-film process stages required for microstructuring the substrate are performed. Only during the last production stages the system is configured once for the special application by releasing or blocking individual microchannels. This can be realized at a considerably smaller expenditure and complexity with regard to devices employed and/or clean room requirements at smaller resolution or by faster progamming. Thus a very high integration density (integration of a plurality of different microreactors) is attained, which is not least due to the fact that appropriately bistable elements are employed as blocking elements which automatically, i.e. without permanent application of control signals, maintain their respective position (blocking or release position).

EXAMPLE A

Use of a Single Photomask (e.g. at Low Resolution by Means of a DMD Projection System) as the Final Configuration Step

EXAMPLE B

Photo-induced and/or Photo-assisted Local Polymerization of Monomeric Solutions and thus Setup of Barrier Elements (Plugs) or Destruction (Obliteration) of said Barrier Elements in a Separate Plane of the Design 2. Independently irreversible and jointly reprogrammable array of bistable blocking elements Prior to commencement of the special application, the connecting structure is configured by releasing or blocking individual microchannels. At the end of the application, this configuration can be cancelled by restoring the complete simple initial state, and the microfluidic system can be employed for another application.

Example: Photo-induced and/or photo-assisted local polymerization. At the end of the application destruction of all polymeric plugs by means of a solvent.

3. Independently reversibly reprogrammable array of bistable blocking elements

At the beginning of and during an application the connecting structure is configured or reconfigured by releasing or blocking individual microchannels by means of dynamically switchable bistable (switching) elements. Since the elements are bistable, they may be successively configured without the control signals or control lines being permanently maintained. This allows, besides inexpensive production, the microfluidic systems to be controlled, regulated, optimized and evolved during the application process in order to use them later for another application.

EXAMPLE A

Passage of Charged Molecules and/or Fluids Through an Electrical Field (Electrical Gate Element and Local RAM)

EXAMPLE B

Hydrophilic/hydrophobic Switch

EXAMPLE C

Optical Programming of a Bistable Element

EXAMPLE D

Thermooptical Control of the Hydrodynamic Resistors of the Channels

EXAMPLE E

Valves Switchable by Means of Magnetic Beads

EXAMPLE F

Phase Transition or Expansion Initiated by Reversible Chemical Reaction as Bistable Drive of a Diaphragm Valve

EXAMPLE G

Mechanically Bistable Diaphragm

EXAMPLE H

Thermooptical Displacement of Oil or Air Bubbles as Reversible Blocking Elements for a Transverse Channel

EXAMPLE I

Alloys with Form Memory

The microreactor network according to the present invention may be produced as follows.

The reactor cell elements, the main inlet channels, the horizontal supply channels and the switching elements are inserted into the substrate (e.g wafer) by means of the microstructuring method. The substrate is structured on both sides.

For this purpose wet-chemical or physical etching techniques may be applied for structuring silicon and photo-structurable glass; galvanic, erosive and micromechanical methods (sawing, cutting, milling, turning) may be applied for machining metals; and laser structuring methods or molding techniques may be applied for processing polymeric materials and functional ceramics.

The reactor cell elements (process elements) may both act as an independent process unit and be designed as a self-programmable unit in that mixing, transporting, reacting, detecting and separating components are integrated in a process element and switched on and off according to requirement.

The substrate containing the so produced structures is sealingly closed by a cover plate made of glass or a transparent polymeric material (bonding, glueing, laminating, ultrasonic and laser welding etc.).

Integration of reconfigurable switching elements: Simple blocking of the channels, e.g. optically controlled by photopolymerizable monomeric fluids, two-component resins in separated chambers, bistable switch, hydrogels, nozzle switching system, which are all electronically, electromagnetically, biologically, chemically, thermally, physically etc. switchable.

The configurable microreactor network of the invention comprises a substrate in which a plurality of over(under-)passing channels are arranged. Said channels are optionally interconnectable via connecting channel arrangements. Between said channels, microreactors are arranged which are connected with the channels. Here, too, channel-connecting arrangements are employed. Said channel-connecting arrangements comprise a plurality of connecting channels in which blocking elements can be positioned or inserted in any other way or activated. The arrangement and/or state of the blocking elements allows the highest possible integration density to be reached respectively for each of a series of specified degrees of (re-)configuration flexibility (the necessity of which depends on the application type).

BRIEF DESCRIPTION OF THE DRAWINGS

Hereunder the present invention is explained in detail with reference to the drawings in which:

FIG. 2 shows an enlarged representation of the connecting channel arrangement made up of four channel sections leading to a point of over(under-)passing, FIG. 3 shows a graphical representation of the connections made possible by the structure shown in FIG. 2, FIG. 4 shows a representation of a connecting channel arrangement made up of four channel sections leading to a point of over(under-)passing, and FIG. 5 shows a graphical representation of the connections made possible by the structure shown in FIG. 4.

DESCRIPTION OF THE PREFERRED EMBODIMENTS

Figure 1:
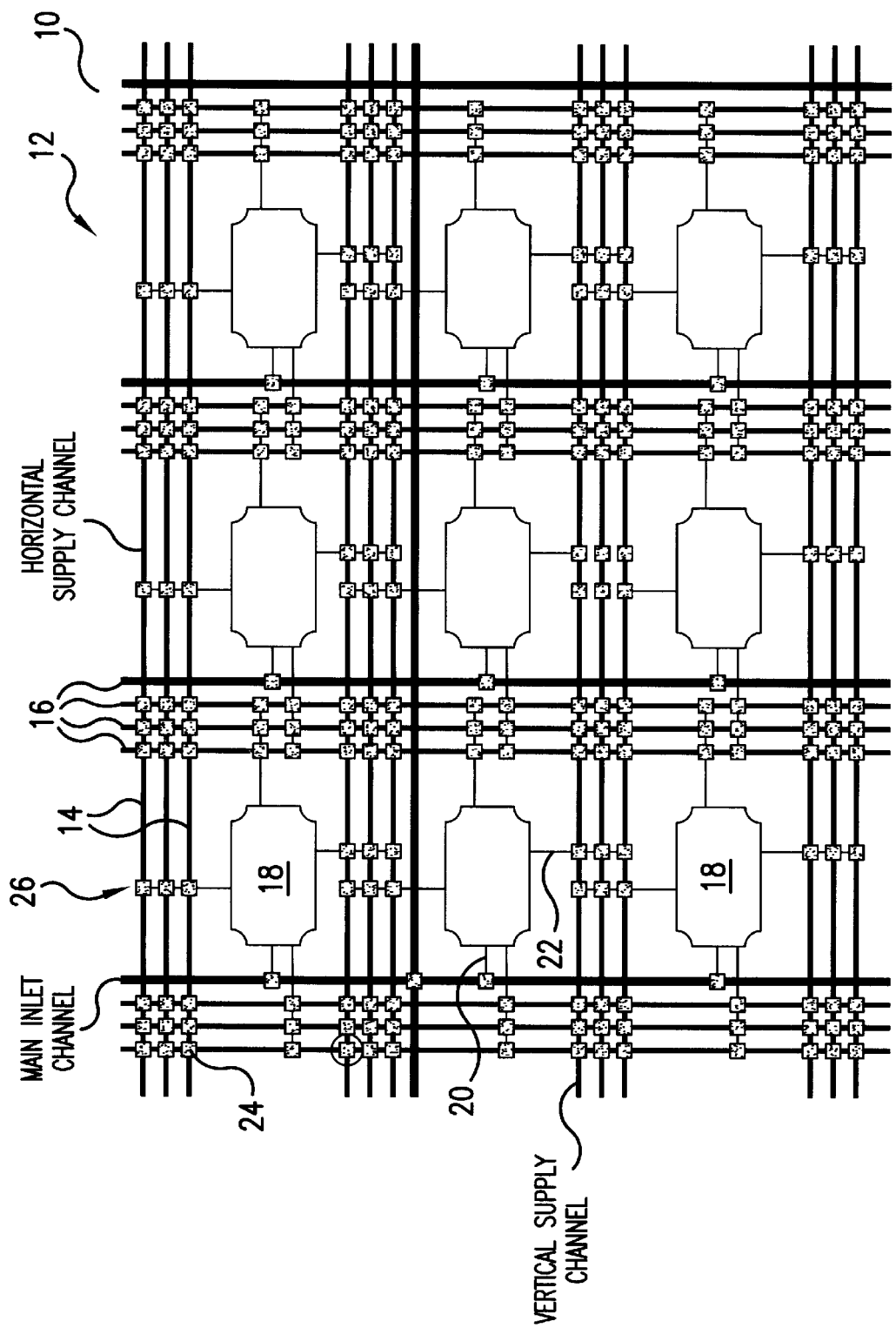
FIG. 1 shows a schematic representation of a microreactor network comprising microreactors and fluid connecting structures arranged in an array.

FIG. 1 shows a top view of a cutout of a substrate 10 on which a microreactor network 12 is formed. On the substrate 10 first channels 14 are arranged in a first plane by means of a microstructuring method, said channels 14 extending in groups and in parallel to each other. Second channels 16 extend transversely to said first channels 14, which second channels 16 extend in a second plane differing from the first plane of the first channels 14 and overpass, i.e. do not intersect, said first channels 14. For example, the first channels 14 are produced in the upper side of the substrate 10, while the second channels 16 are formed in the lower side. Between the first and second channels 14, 16, which are arranged systematically in the form of a network, microreactors 18 are located which have different functions (mixing, transport, reaction, detection, separation) according to requirement. From the microreactors 18 first branch channels 20 extend over the second channels 16 arranged on both sides of the microreactors 18, and second branch channels 22 extend over the first channels 14 also arranged on both sides of the microreactors 18. The first branch channels 20 are formed in the upper side of the substrate 10, while the second branch channels 22 are formed in the lower side of the substrate 10.

As can be seen from the above description, the channels are not interconnected just by arrangement of the first and second channels and/or branch channels in different planes, i.e. special measures are to be taken. The interconnection is rather realized by special connecting channel arrangements 24,26 which will be explained in detail below with reference to FIGS. 2 to 5. It is the object of said connecting channel arrangements 24,26 to optionally, i.e. according to requirement and thus according to application of the microreactor network, release or block certain connections between channels overpassing each other. This results in the production-technically realizable configurability or reconfigurabilitiy of the microreactor network 12 described here.

With reference to FIG. 2 the setup of a connecting channel arrangement 24 is described in detail below. Said connecting channel arrangement 24 is disposed between a first channel 14 and a second channel 16 and comprises a network of connecting channels 28 to 40 via which sections 15,15' and 17,17' of the first and second channels 14,16, which lead the connecting channel arrangement 24, are connected. Said connecting channels 28 to 40 comprise braching points 42 to 52 where the individual connecting channels branch off each other or are interconnected. Between adjacent branching points programmable plugs in the form of blocking elements 1 to 6 are located which are either active, i.e. block the connecting duct in which they are arranged, or deactivated, i.e. allow fluid flow through the connecting channel concerned. "Deactivated" plug or blocking element 1 to 6 in this context also means a non-existing blocking element. In other words, programming can be carried out during the production process by selectively employing the blocking elements 1 to 6, or programming can be effected later "from outside".

As is easily conceivable, the connecting channel arrangement shown in FIG. 2 allows creation of different connecting structures by omission of individual blocking elements 1 to 6. A survey of the possible connecting structures stating those plugs which have to be omitted in individual cases is shown in FIG. 3. In equivalence to the representation shown in FIG. 3 of omission of individual blocking elements the reference numerals of the blocking elements required for realization of the individual connecting structures could be stated.

A special feature of the connecting channel arrangement 24 shown in FIG. 2 is that all blocking elements 1 to 6 are arranged in connecting channels located in a common plane (in this embodiment in the upper side of the substrate, i.e. the plane of channels 14). This is of advantage with regard to "programming" since programming can be effected from one side of the substrate (in this case from the upper side). However this finally depends on the mechanisms employed to change the switching state of the blocking elements 1 to 6.

FIGS. 4 and 5 show the configuration and realization of connecting structures in the case of a connecting channel arrangement 26 as required for points of overpassing in the case of the channel structure and the microreactor network 12 shown in FIG. 1. The principle is the same as in the case of the connecting channel arrangement 24 shown in FIG. 2 and therefore identical elements bear identical reference numerals.

The possibilities of change-over and variation of the switching state of the blocking elements 1 to 6 have been described in detail above. The configuration of the connecting channel arrangements 24, 26 according to the two embodiments described with reference to FIGS. 2 to 5 allows one to set up configurable microreactor networks in a very small space, i.e. with a high integration density. In the field of microfluidics it is thus possible in a simple manner to produce customer-tailored and customer-programmable microreactor networks.

Although preferred embodiments of the invention have been specifically illustrated and described herein, It is to be understood that minor variations may be made without departing from the spirit and scope of the invention, as defined in the appended claims.

What is claimed is:

1. Configurable microreactor network provided with
    a substrate,
    a plurality of microreactors arranged in the substrate for chemical and/or biological and/or biochemical and/or other type of processing and/or treatment of chemical and/or biological and/or biochemical substances,
    first channels arranged in the substrate and divided into first groups, wherein each first channel group comprises at least one first channel, and wherein the microreactors are arranged between adjacent first channel groups,
    second channels arranged in the substrate and extending in overpassing regions above or below the first channels, said second channels being divided into second groups, wherein each second channel group comprises at least one second channel, and wherein the microreactors are arranged between adjacent second channel groups,
    first branch channels starting from the microreactors, said first branch channels being arranged in the substrate and extending in overpassing regions to above or below the second channels of the respective adjacent second channel groups,
    second branch channels starting from the microreactors, said second branch channels being arranged in the substrate and extending in overpassing regions to above or below the first channels of the respective first channel groups adjacent the microreactors, and
    a plurality of connecting channel arrangements assigned to at least some of the overpassing regions of the first and second channels, of the first branch channels and the second channels, and of the second branch channels and the first channels, wherein each connecting channel arrangement comprises:
        at least one connecting channel between at least two channel sections of the first and/or second channels and/or branch channels leading to an overpassing region,
        wherein each connecting channel extends from a channel section of an overpassing region to another channel section of said overpassing region, and
        wherein, in the connecting channels and/or in the channel sections, blocking elements are arranged for optionally blocking the fluid connection provided by a connecting channel for the purpose of blocking/releasing the fluid connection between the at least two channel sections of an overpassing region.

2. Configurable microreactor network according to claim 1, wherein the the blocking elements are designed as invariable blocking bodies selectively arranged in connecting channels during the production process and provided for permanent blocking of selected connecting channels and/or channel sections.

3. Configurable microreactor network according to claim 2, wherein the blocking elements can be selectively changed over in a chemical, biological, physical or any other manner from a release state, in which the connecting channels are released, to a blocking state, in which the connecting channels are blocked, or vice versa, and wherein said blocking elements remain in one of said states, in particular without further individual control.

4. Configurable microreactor network according to claim 3, wherein the process of change-over of the blocking elements from the release state to the blocking state or vice versa can be performed only one time.

5. Configurable microreactor network according to claim 3, wherein the process of change-over of the blocking elements from the release state to the blocking state is reversible.

6. Configurable microreactor network according to claim 5, wherein the process of change-over of the blocking elements from the release state to the blocking state or, alternatively, vice versa can be performed selectively, and the process of change-over of the blocking elements from the blocking state to the release state or, alternatively, vice versa can be jointly performed for all blocking elements.

7. Configurable microreactor network according to claim 1, wherein at least some of the connecting channels of at least one connecting channel arrangement are interconnected and branch off each other at branching points.

8. Configurable microreactor network according to claim 7, wherein between adjacent branching points a blocking element can be positioned.

9. Configurable microreactor network according to claim 8, wherein all blocking elements of a connecting channel arrangement are disposed in a common plane of the substrate, in particular the first or the second plane.

10. Configurable microreactor network according to claim 9, wherein the blocking elements of all connecting channel arrangement are disposed in a common plane of the substrate, in particular the first or the second plane.

11. Configurable microreactor network according to claim 1, wherein the microreactors have the functions of mixing, transporting, reacting, detecting and/or separating or combinations thereof.

12. Configurable microreactor network according to claim 1, wherein each microreactor comprises a plurality of components designed for mixing, transporting, reacting, detecting and/or separating or combinations thereof, wherein the first and/or second branch channels extend from each one of said components, and wherein the branch channels contain blocking elements for optional blocking of the fluid connection provided by the branch channels for the purpose of influencing the functions to be performed by the microreactors.

13. Configurable microreactor network according to claim 12, wherein the blocking elements are configured as invariable blocking bodies selectively arranged in connecting channels during production of the substrate and designed for permanently blocking or releasing selected connecting channels.

14. Configurable microreactor network according to claim 12, wherein the blocking elements can be selectively changed over in a chemical, biological, physical or any other manner from a release state, in which the connecting channels are released, to a blocking state, in which the connecting channels are blocked, or vice versa, and wherein said blocking elements automatically remain in one of said states.

15. Configurable microreactor network according to claim 12, wherein the process of change-over of the blocking elements from the release state to the blocking state, or vice versa, can be performed one single time.

16. Configurable microreactor network according to claim 12, wherein the process of change-over the blocking elements from the release state to the blocking state is reversible.

17. Configurable microreactor network according to claim 12, wherein the process of change-over of the blocking elements from the release state to the blocking state or, alternatively, vice versa can be performed selectively, and the process of change-over of the blocking elements from the blocking state to the release state or, alternatively, vice versa can be jointly performed for all blocking elements.

18. Configurable microreactor network according to claim 17, wherein at least some of the connecting channels of at least one connecting channel arrangement are interconnected and branch off each other at branching points.

19. Configurable microreactor network according to claim 18, wherein between respective adjacent branching points a blocking element can be positioned.

20. Configurable microreactor network according to claim 19, wherein all blocking elements of a connecting channel arrangement are disposed in a common plane of the substrate, in particular the first or the second plane.

21. Configurable microreactor network according to claim 20, wherein the blocking elements of all connecting channel arrangements are disposed in a common plane of the substrate, in particular the first or the second plane.

22. Configurable microreactor network according to claim 1, wherein the substrate comprises a lower side and an upper side, wherein the first channels are formed in the one side and the second channels in the other side of the substrate or, as, an alternative, the first channels and the second channels are formed in the one side of the substrate and the channels of one of these groups of channels in their overpassing regions are formed in the other side of the substrate, and wherein the upper and lower sides of the substrate are covered by covering layers.

23. Configurable microreactor network according to claim 1, wherein the first branch channels extend in a first plane and the second branch channels extend in a second plane.

24. Configurable microreactor network according to claim 1, wherein the microreactors and all channels are arranged in the form of an array.

* * * * *